July 25, 1961

G. HOHWART ET AL 2,993,473

AIR OPERATED CHUCK

Filed Aug. 30, 1960

INVENTORS.
George Hohwart
Arthur R. Lundin
BY
Harness, Dickey & Pierce
ATTORNEYS July 25, 1961 G. HOHWART ET AL 2,993,473
AIR OPERATED CHUCK
Filed Aug. 30, 1960 4 Sheets-Sheet 2

INVENTORS.
George Hohwart.
Arthur R. Lundin.
BY
Harness, Dickey & Pierce.
ATTORNEYS.

United States Patent Office 2,993,473
Patented July 25, 1961

2,993,473
AIR OPERATED CHUCK
George Hohwart, Farmington Township, and Arthur R. Lundin, Huntington Woods, Mich., assignors to N. A. Woodworth Company, Ferndale, Mich., a corporation of Michigan
Filed Aug. 30, 1960, Ser. No. 52,929
10 Claims. (Cl. 121—38)

This invention relates to new and useful improvements in operating mechanisms for power chucks and the like.

Diaphragm chucks, for example, conventionally are actuated by air cylinders. In each instance air is supplied to one or more cylinders through single or double rotary slip couplings; however, in certain situations, as where the work extends through the spindle of the machine, it is not possible to use a standard slip coupling. As a consequence, it simply is not practicable to use a conventional diaphragm chuck of the type referred to to hold the work.

An important object of the present invention is to provide novel means for introducing air to the power cylinder through the periphery of the chuck so that the latter is more nearly universal in its application than heretofore.

Another object of the invention is to provide an air coupling of the above-mentioned character that operates automatically in whatever position the chuck happens to stop and that requires nothing more of the operator than is necessary in the case of a conventional chuck.

Still another object of the invention is to provide an air coupling of the above-mentioned character that is mechanically simple and relatively trouble-free in use.

Other objects and advantages of the invention will be apparent during the course of the following description.

In the drawing forming a part of this specification and wherein like numerals are employed to designate like parts throughout the same.

FIGURE 5 is a fragmentary sectional view taken on the line 5—5 of FIGURE 4.

Figures 1, 2:
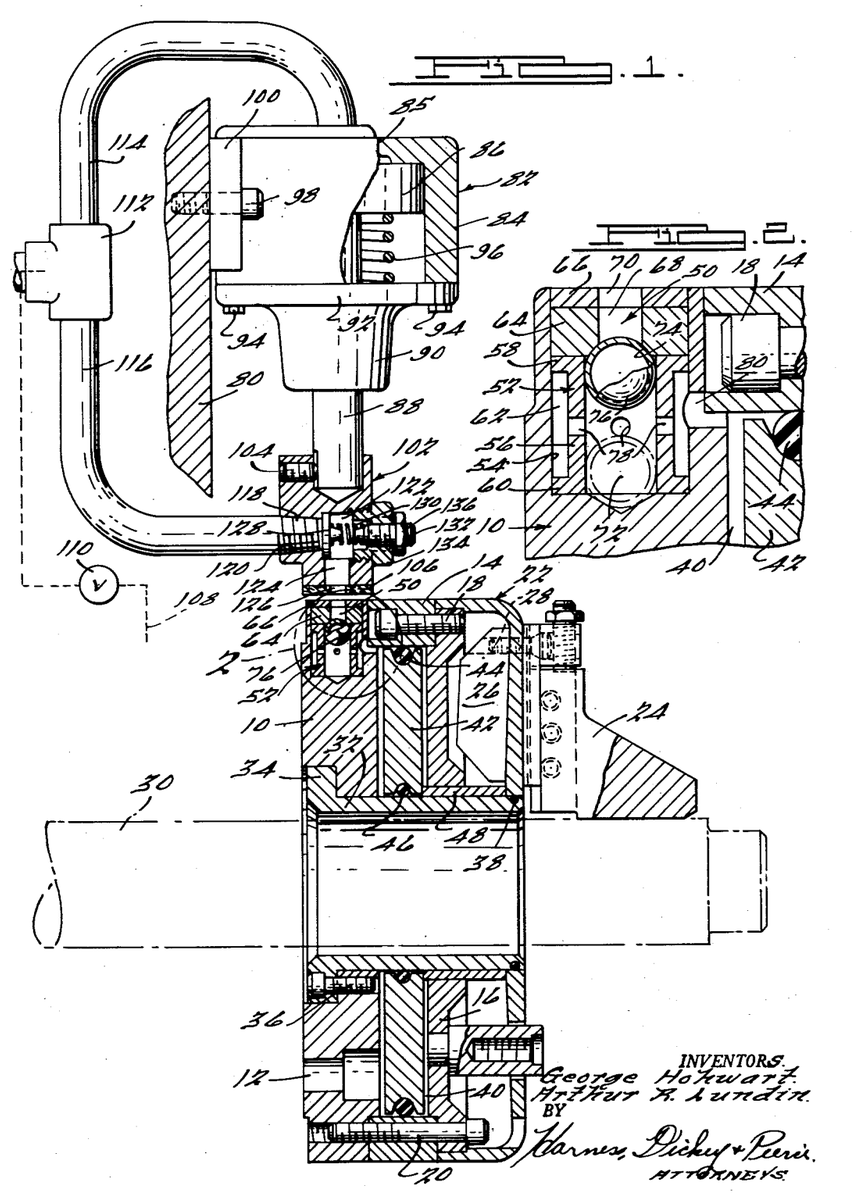
FIGURE 1 is a vertical sectional view taken on the line 1—1 of FIG. 3 showing a power operated diaphragm chuck equipped with a device embodying the instant invention for supplying air to the power cylinder.
FIGURE 2 is an enlarged sectional view showing the portion of FIGURE 1 enclosed in the circle 2.

The diaphragm chuck shown in FIGURE 1 is a conventional type similar to the one shown in the Hohwart et al. Patent No. 2,491,611. In this instant, however, the chuck is adapted to accommodate a workpiece extending through the spindle of the machine on which the chuck is mounted in order to illustrate the special situation in which this invention is particularly useful.

Broadly, the chuck comprises a circular mounting plate 10 having holes 12 which receive screws (not shown) for fastening the chuck to the end of the machine spindle (also not shown). A ring 14 is mounted on the forward face of the plate 10, and a circular backing plate 16 is superimposed on the ring. The backing plate 16 is fastened to the ring 14 by screws 18, and both the backing plate 16 and the ring 14 are fastened to the mounting plate 10 by screws 20. The periphery of the ring 14 is flush with the periphery of the backing plate 10; and, as shown, the backing plate 16 is slightly smaller in diameter than the ring 14. It will be observed that the ring 14 is recessed into the mounting plate 10 and the backing plate 14 to assure a proper interfitting relationship of the parts at assembly.

Figure 3:
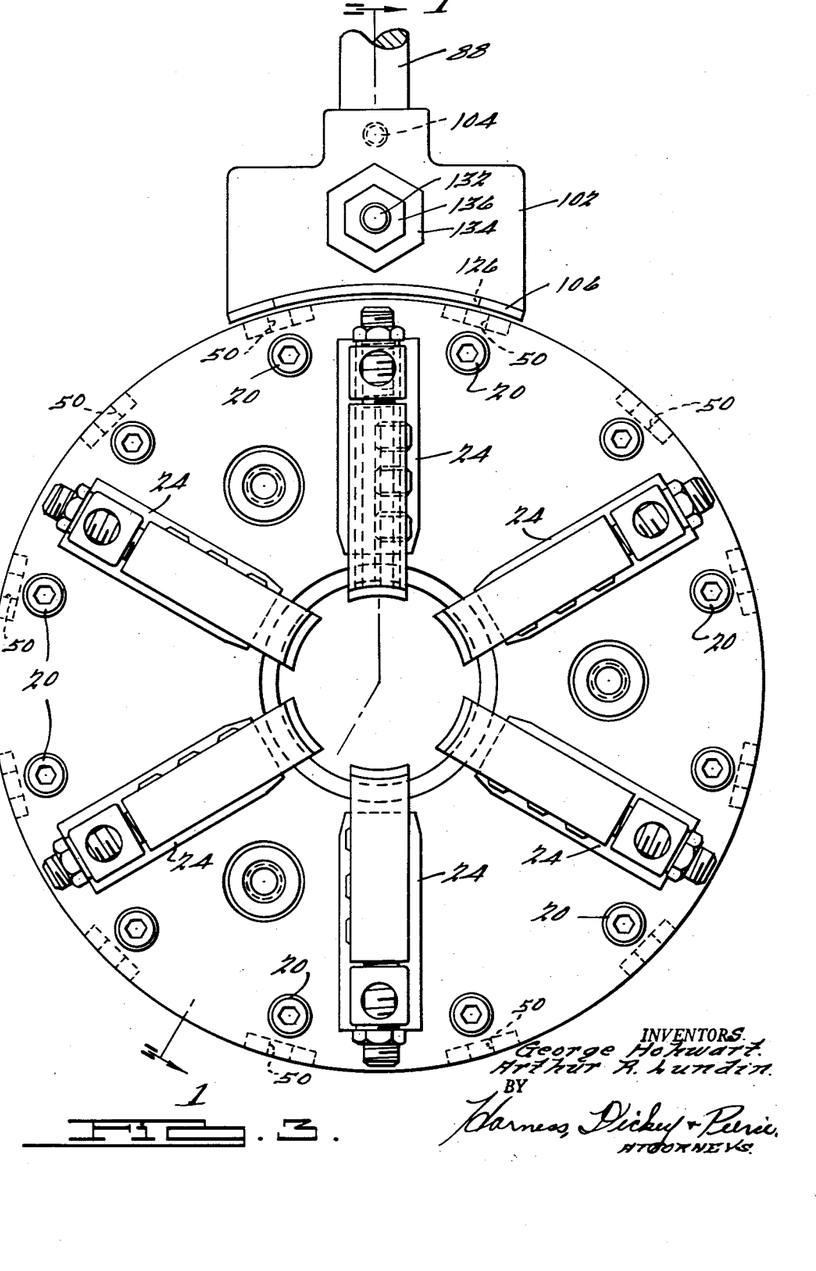
FIGURE 3 is a front elevational view thereof.

A cup-shaped diaphragm 22 is piloted on the backing plate 16 with the edge of the rim portion thereof butting against the front face and flush with the periphery of the ring 14. The diaphragm 22 can be fastened to the backing plate 16 by screws or the like but they preferably are fused together as shown in the Hohwart et al. Patent No. 2,492,640. As shown in the drawing, the radial bottom portion of the diaphragm 22 preferably is tapered somewhat toward the periphery thereof. Work clamping jaws 24 are mounted on the outside of the diaphragm 22 opposite internal counterweights 26, and the jaws and counterweights are fixed to the diaphragm in any suitable manner as by screws 28 or by brazing as shown in the Hohwart et al. patent last referred to. Any suitable number and type of jaw can be used. Six jaws 24 are here shown (FIG. 3). The shape of the jaws 24 may vary considerably depending upon the nature and form of the workpiece to be clamped thereby. The jaws 24 here shown by way of example are adapted to grip a generally cylindrical rod-like workpiece 30 which extends axially through the spindle of the machine and centrally through the chuck.

In order to accommodate the workpiece 30 the chuck is provided with a central tubular liner 32 which extends from the mounting plate 10 forwardly through the diaphragm 22. As shown, the liner 32 is formed at the rearward end thereof with a radial flange 34 which is recessed or set in the rear face of the mounting plate 10 and fastened securely thereto by screws 36. At its forward end, the liner 32 terminates substantially flush with the outer radial face of the diaphragm 22 and the joint between the liner and the diaphragm is sealed by an O-ring 38 or the like.

It will be observed that the mounting plate 10, ring 14 and backing plate 16 collectively define a cylinder 40 and that a piston 42 is mounted for reciprocation in the cylinder. An O-ring 44 seals the outer periphery of the piston 42 to the ring 14, and an O-ring 46 seals the inner periphery of the piston to the liner 32. A sleeve 48 fits snugly but slidably within the backing plate 16 and around the liner 32 with the ends thereof butting against the diaphragm 22 and the piston 42. In its normal relaxed position, the diaphragm 22 holds the jaws 24 clamped solidly against the workpiece 30, and the jaws preferably are radially adjustably mounted on the diaphragm as disclosed in the Hohwart et al. Patent No. 2,464,507, for example, so that they can be suitably positioned to mutually engage and simultaneously clamp the workpiece.

In order to release the jaws 24 from the workpiece 30, fluid (usually air) under pressure is introduced into the cylinder 40 behind the piston 42. Force exerted by the fluid against the piston 42 causes the latter to advance in cylinder 40; and, as it moves forwardly, the piston acts through the pusher sleeve 48 to impart a corresponding movement to the diaphragm 22. Outward flexure of the diaphragm 22 in the manner described rocks the jaws 24 forwardly and outwardly away from the workpiece 30 so that the latter can be moved relative to the jaws.

Most machine shops are equipped with air-pressure lines, and chucks of the type here shown are adapted to be operated by air at normal shop pressure. When air pressure to the cylinder 40 is shut-off and the cylinder is vented to atmosphere, the inherent resiliency of the diaphragm 22 pulls the jaws 24 back into clamping engagement with the workpiece 30. The open center chuck here shown is particularly suited for use on a screw machine, for example, where a long rod or bar of stock is fed in successive movements through the spindle and chuck. In a normal operation, the jaws 24 clamp the workpiece 30 and the chuck is rotatably driven to rotate the work while a cutting, turning, grinding, cut-off or other operation is performed thereon. When the operation is complete, the chuck is stopped and the diaphragm 22 is flexed to open the jaws 24 so that the work can be advanced preparatory to the next operation. Thereafter, pressure on the diaphragm is released so that the jaws 24 again clamp the work 30.

According to the present invention, air is admitted to the cylinder 40 behind the piston 42 through valve controlled ports 50 which open radially through the periphery of the chuck, as shown in FIG. 1, and are spaced uniformly around the circumference of the chuck. Twelve of the ports 50 are here shown (FIG. 3), but the number of ports used in any particular situation may vary depending upon the diameter of the chuck and other factors, as will be apparent.

Each of the ports 50 comprises a valve assembly of the type shown in FIG. 2, and each assembly comprises a spool 52 in and snugly fitting a fluid socket or bore 54 which extends radially into the mounting plate 10 from the periphery thereof. The spool 52 comprises a generally tubular body 56 having outwardly extending radial flanges 58 and 60 at the ends thereof. As shown in the drawing, the flanges 58 and 60 fit snugly within the bore 54 and hold the tubular body 56 of the spool 52 spaced radially inwardly from the bore to define an annular chamber 62. A disc shaped magnet 64 is disposed in the bore 54 on top of the spool 52 and a disk 66 is press-fitted or otherwise fastened in the bore on top of the magnet to hold the latter securely in place. The two disks 64 and 66 are provided with aligned apertures 68 and 70, respectively, that register with and open into the internal chamber 72 defined by the spool 52. The two apertures 68 and 70 are smaller in diameter than the chamber 72 and a valve seat 74 is provided at the inner side of the magnet 64. A valve 76 in the chamber 72 is adapted to engage the tapered, conical seat 74 to close the apertures 68 and 70. A ball valve is here shown but other suitable valve forms can be used if desired. If a ball shaped valve is used, it may be either hollow or solid. However, a hollow ball valve is preferred as it has less mass than a solid ball and it, therefore, is less likely to be dislodged from its seat by shock or vibration. If desired, the valve seat 74 may be formed separately from the magnet and of resilient material to overcome shock and vibration, to assure quietness in operation and to prevent brinelling or other damage to the valve when it is thrown outwardly against its seat by centrifugal force when the chuck is rotated. A preferred way of making a resilient valve seat is simply to coat the magnet with a thin film of rubber or the like. A plurality of circumferentially spaced radial openings 78 provided in the spool body 56 substantially at the middle thereof affords communication between the internal chamber 72 and the external chamber 62, and an opening 80 in the mounting plate 10 affords communication between the outer chamber 62 and the cylinder 40 behind the piston 42.

When the valve 76 is at the bottom of the spool 52 and below or behind the openings 78, as shown by broken lines in FIG. 2, the port 50 is open and air can flow freely between the cylinder 40 and the apertures 68 and 70. On the other hand, when the valve 76 is on its seat 74, as shown by full lines in FIG. 2, the port 50 is closed and communication between the cylinder 40 and the apertures 68 and 70 is shut-off.

Now considering the ports 50 collectively, it will be apparent that the valve 74 in any port 50 can be unseated or opened by introducing air into the port under pressure sufficient to overcome the magnetic attraction of the seat 74. All of the valves 76, when seated, are held closed by air pressure within the cylinder 40 and chamber 72 so long as that pressure is greater than the external pressure in the apertures 68 and 70. Also, the valves 76 will be thrown outwardly against their seats 72 and held in this position by centrifugal force when the chuck is rotated.

Mounted on a stationary support 80 radially outwardly of and behind the chuck is an air cylinder 82 which comprises a cylindrical open-ended housing 84 and a reciprocable piston 86 having a piston rod 88 which extends downwardly through the bearing portion 90 of a removable end wall 92 which closes the open end of and is removably fastened to the housing by screws 94. A spring 96 in the housing 84 behind the piston 86 holds the latter normally advanced or raised as viewed in the drawing. Screws 98 extending through lugs 100 on the housing 84 hold the air cylinder 82 fastened securely to the support 80.

The support 80 can be a stationary part of the machine on which the chuck is mounted or it can be a suitable stationary member not a part of the machine. The important thing is that the air cylinder 82 be positioned so that a shoe 102 on and fastened to the end of the piston rod 88 by a set screw 104 is aligned radially with the rear marginal peripheral surface of the chuck and particularly with the ports 50. When the piston 86 is held in its normal advanced position by the spring 96, the shoe 102 is spaced radially outwardly from the chuck, but it will be readily apparent that the shoe can be moved into engagement with the chuck by retractive or downward movement of the piston 86. As best shown in FIG. 3, the under surface of the shoe 102 is arcuately curved to conform to and complement the periphery of the chuck, and a strip sealing material 106, such as felt, rubber or the like, on the under surface of the shoe seals the latter to the periphery of the chuck when the shoe is engaged with the chuck.

Air under pressure from any suitable source is conducted to the apparatus of this invention through a supply pipe 108 controlled by a valve 110. When the valve 110 is open, air under pressure is admitted to the apparatus, and when the valve is closed, flow of air to the apparatus is shut off and air under pressure in the apparatus is vented to atmosphere through the valve. As shown in FIG. 1, the pipe 108 is connected to a T-fitting 112. A branch pipe 114 extends from one side of the fitting 112 to the air cylinder 82 and a flexible tube or pipe 116 extends from the other side of the fitting 112 to the shoe 102. The branch pipe 114 connects to the closed end 85 of the housing 84 so that air passing through the branch enters the housing ahead of the piston 86. The threaded end 118 of branch pipe 116 is screwed into an internally threaded hole 120 in the shoe 102. Air discharged from the branch 116 flows into a chamber 122 in the shoe and thence through registering elongated, slot-like apertures 124 and 126 in the shoe and sealing strip 106, respectively, which align with the ports 50. Flow of air from the branch pipe 116 into the chamber 122 is, however, controlled by a valve 128 which seats against the side of chamber 122 and over the opening 120. A spring 130 in the chamber 122 behind the valve 128 holds the latter normally closed. A set screw 132 extending through a fitting 134 mounted in the shoe 102 opposite the valve 128 seats the end of the spring 130 remote from the valve. Inward movement of the set screw 132 increases the tension of the spring 130 and outward movement of the set screw reduces the tension. A lock nut 136, threaded on the set screw 132, is tighened against the fitting 134 to hold the set screw in a selected adjusted position. Most shops are equipped with an air line for operating various machines and equipment in the shop, and if desired the apparatus of this invention may simply be connected to the conventional shop air line.

At the beginning of the operating cycle, the shoe 102 is retracted as shown in FIG. 1 and the chuck is stationary. Opening of valve 110 begins the cycle of operation. Air entering the branch pipe 116 is blocked by the valve 128; however, air traversing the branch pipe 114 enters the cylinder 82 and causes the piston 86 to move downwardly in the cylinder 84 as viewed in FIG. 1 and thereby move the shoe 102 against the periphery of the chuck. Thereafter, air pressure against the piston 86 holds the shoe in pressed engagement with the chuck and the sealing strip 106 maintains an airtight union of the shoe with the chuck. As soon as contact is established between the shoe 102 and the chuck, pressure builds up in the branch pipe 116 sufficiently to unseat the valve 128 which then opens to admit air under pressure into the chamber 122 and thence through the apertures 124 and 126 to the port or ports 50 in the register therewith. FIG. 3 shows the chuck positioned with two ports 50 in register with the aperture 126. Manifestly, rotation of the chuck in either diretcion from the position shown in the drawing will bring one or the other of the ports 50 fully into register with the aperture 126 and in every rotative position of the chuck at least one port 50 around the periphery thereof will be in register with the aperture.

Air under pressure entering any port 50 unseats the valve 76 in such port permitting air to pass through the openings 78 and into the cylinder 40 behind piston 42. Thereafter, air pressure in the port 50 continues to hold the valve 76 below or behind the openings 78, as shown by dotted lines in FIG. 2, so that full or substantially full line pressure exists in the cylinder 40 to hold the piston 42 in the forward position. As the piston 42 advances, it acts through the sleeve 48 to flex the diaphragm 22 which in turn releases the jaws 24 from the work 30 so that the latter can be advanced or otherwise adjusted or moved in the machine.

Preparatory to starting the machine again in operation, the valve 110 is closed shutting off pressure to the cylinder 82 and shoe 102 and venting the same to atmosphere. Immediately, the spring 96 acting on the piston 86 moves the shoe 102 out of engagement with the chuck. This action also opens cylinder 40 to atmosphere so that piston 42 can retract and diaphragm 22 flex back to its normally closed position with the jaws 24 clamped tightly on the work 30.

It has been a particular problem in the operation of this device to get air out of the cylinder 40 when valve 110 is closed to line pressure, and this is accomplished according to the present invention by the openings 78 in the spool 52. In this connection, it will be noted, the openings 78 are positioned to be above or in front of the valve 76 when the latter is at the bottom of the spool 52. By reason of this particular location of the openings 78, air is discharged from the cylinder 40 as jets through the openings, and these air jets impinge on the open valve 76 and hold it open until all or substantially all of the air pressure in the cylinder has been relieved. However, as soon as the chuck begins to rotate, centrifugal force acting on the open valve 76 causes it to move outwardly against its seat 74. Thereafter, magnetic attraction of the disk 64 for the valve 76 holds the latter closed, thus preparing the chuck for another cycle of operation.

Figures 3, 4, 6:
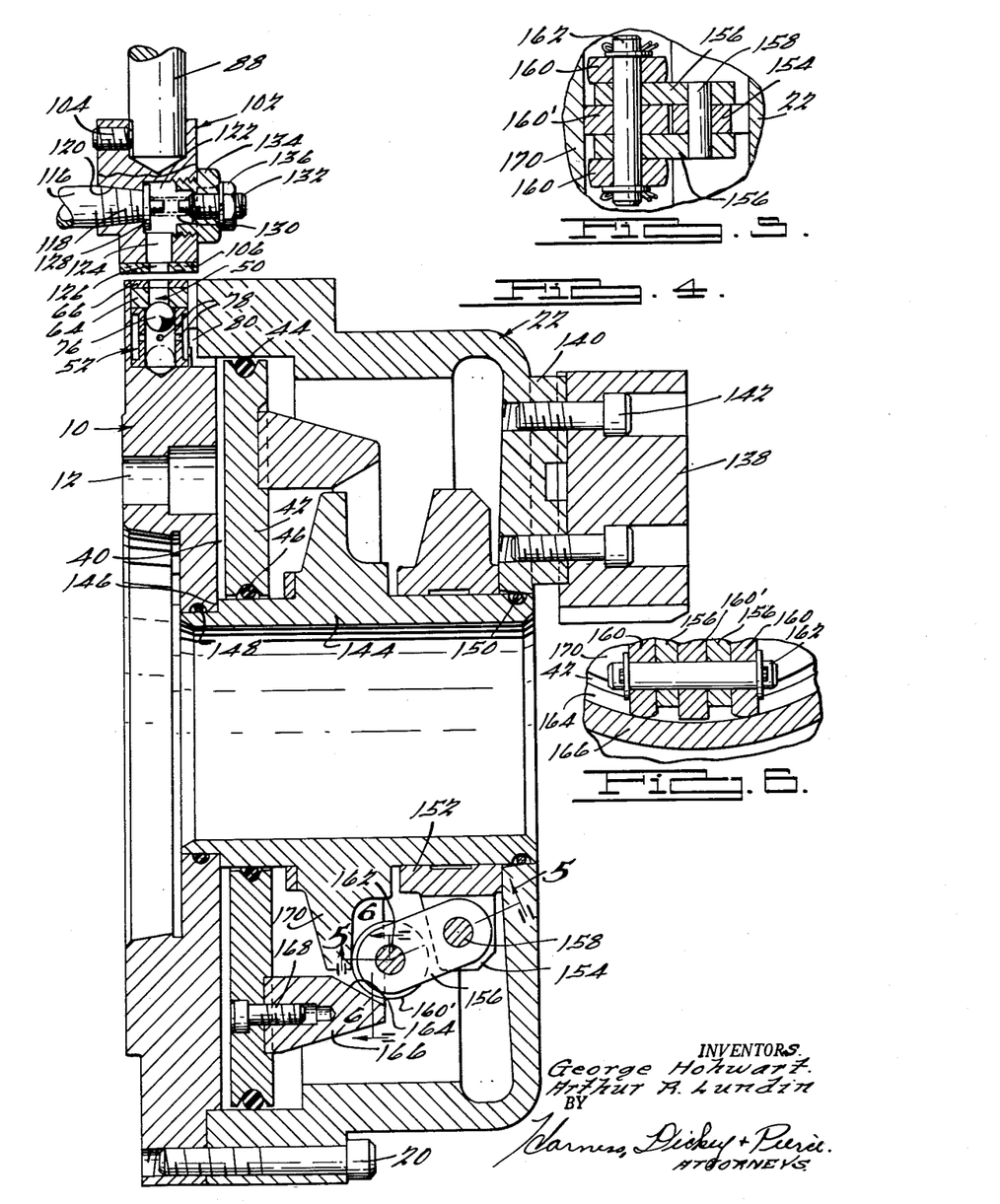
FIGURE 4 is a vertical sectional view showing a modified diaphragm chuck similarly equipped with the air supply device of this invention.
FIGURE 6 is a fragmentary sectional view taken on the line 6—6 of FIGURE 4.

It will be apparent from the foregoing that the mechanism of this invention can be adapted to various types of chucks and particularly to different forms of diaphragm chucks. FIGS. 4 and 5 show such a modified chuck. In describing this form of the invention, corresponding numerals are used to designate corresponding parts and only the novel structure of the modified chuck is described in detail.

First, it will be noted that the modified chuck has a different jaw and jaw mounting; however, both forms of jaws and both mountings are conventional and a detailed description therefore is not necessary. Suffice it to say that the diaphragm 22 has jaw mountings 140 formed thereon which receive and inter-engage with the jaws 138 and that screws 142 fasten the jaws securely but detachably to the jaw mountings.

Also, the modified chuck has a different mechanism for transmitting motion from the piston 42 to the diaphragm 22. In this form of the invention, a sleeve 144 extends between and is snugly received at its ends in centrally disposed openings in the mounting plate 10 and diaphragm 22, respectively. At its rearward end, the sleeve 144 has a radial shoulder 146 which seats against the forward face of the backing plate 10, and an O-ring 148 seals the joint between the backing plate and the sleeve. At its forward end, the sleeve 144 is slidably received by the diaphragm 22 and the joint between the diaphragm and the sleeve is similarly sealed by an O-ring 150. The piston 42 is slidable on the sleeve 144 similarly to the piston in the first form of the invention and it is similarly sealed to the sleeve by an O-ring 46.

Slidably supported on the sleeve 144 behind the diaphragm 22 is a ring 152 having a plurality of equispaced radially outwardly extending lugs 154 each of which carries a pair of toggle links 156 connected thereto by a pivot 158. Equidiameter rollers 160 mounted on a pivot 162 at the other ends and at the other sides of the toggle links 156 ride on and constantly engage the inner bevelled or tapered cam surface 164 of a cam ring 166 (FIG. 6) which is mounted on the forward face of the piston 42 coaxially with the turning axis of the chuck and concentrically to the sleeve 144. In order to assure a solid mounting for the cam ring 166, it preferably is recessed or set into the piston, as shown in the drawing, and fastened thereto by screws 168 or the like. A larger diameter roller 160' mounted on the pivot 162 between the toggle links 156 constantly engages and rides on the front face of a radially outwardly extending flange 170 on the sleeve 144 as shown in FIG. 5.

It will be observed that the toggle links 156 are confined by the cam ring 166 and that, as the piston 42 advances, the rollers 160 riding inwardly on the cam surface 164 tend to straighten the toggle links. However, the rollers are prevented from moving rearwardly by the middle roller 160' which remains constantly in engagement with the flange 170. Inasmuch as the flange 170 and sleeve 144 are prevented from moving rearwardly by the radial shoulder 146, the resultant force created by advancement of the piston 42 is relieved by forward flexure of the diaphragm 22. As the diaphragm 22 flexes, it rocks the jaws 138 forwardly and outwardly to open the jaws 138 and disengage a workpiece clamped thereby.

Manifestly, there is considerable multiplication of force through the toggle levers 156 which increases as the toggles approach a position parallel to the axis of the chuck. Accordingly, the mechanism here shown has particular utility on relatively large chucks or on chucks in which the diaphragm 22 is relatively stiff and inflexible.

It will be apparent that the operation of the modified chuck last described is identical to the operation of the chuck first described.

Figure 7:
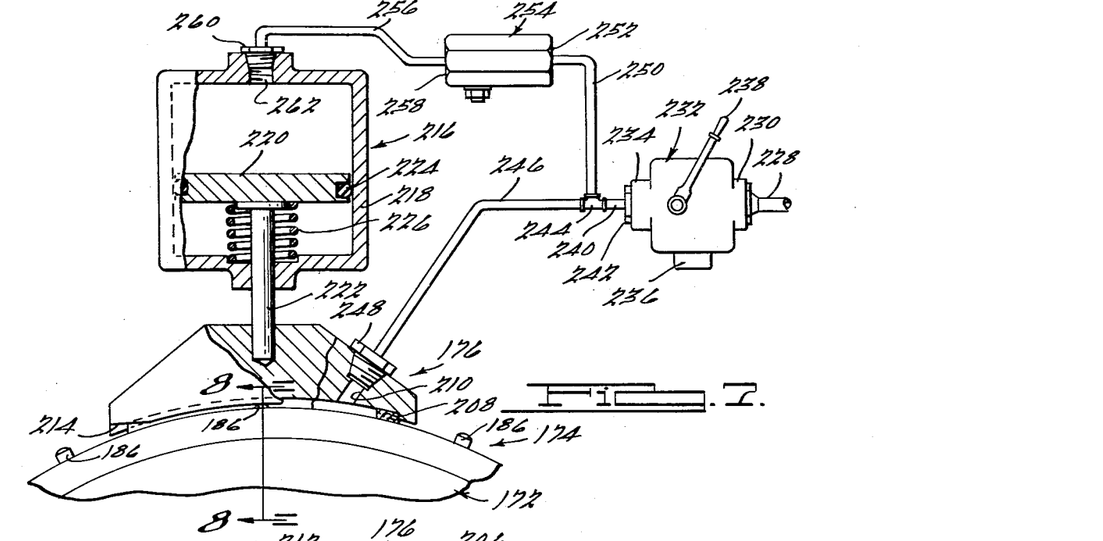
FIGURE 7 is a view taken transversely of the chuck and showing still another modification of the invention.
Figure 8:
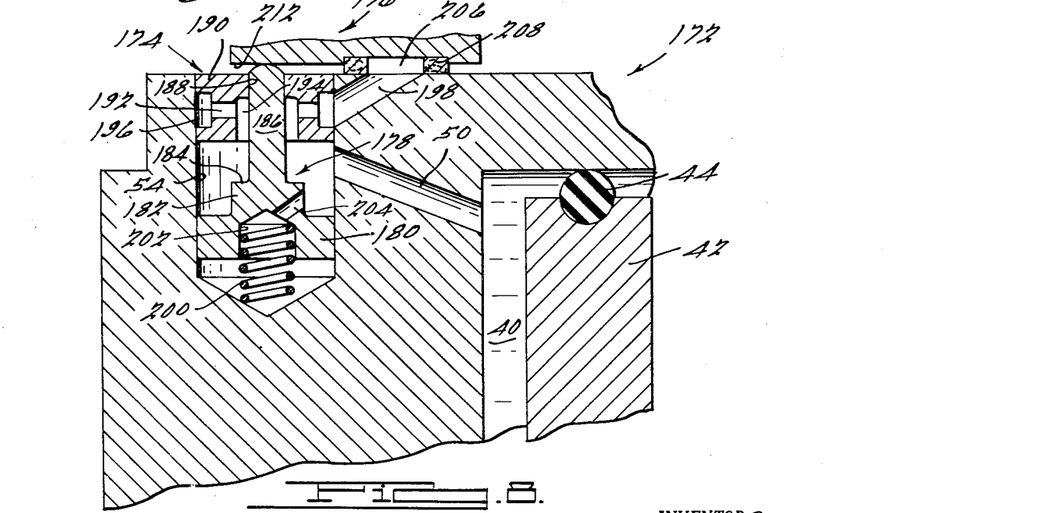
FIGURE 8 is an enlarged fragmentary vertical sectional view taken on the line 8—8 of FIG. 7.

Under some conditions, as in high speed, high production operations, it may be necessary or desirable to operate the chuck valves mechanically, and a modified construction operative in this manner is shown in FIGS. 7 and 8. In this form of the invention a diaphragm chuck 172 is shown that may be identical to either of the chucks shown in FIGS. 1 and 4 except for the air control valves in the periphery of the chuck and the operating means therefor. The instant chuck has a plurality of modified, mechanically operable, air control valves 174 spaced uniformly around the periphery thereof; and, as in the first forms of the invention the valves are spaced sufficiently close together so that at least one of them is operated by the shoe 176 in any rotative position of the chuck. For convenience and in the interest of clarity, parts of the chuck 172 which are identical to the forms previously described are identified by the same reference numerals.

All of the valves 174 are identical in construction and operation, and a detailed description of one therefore will suffice. As shown in FIG. 8, each valve 174 is disposed in a bore 54 extending radially into the chuck bore 72 from the periphery thereof and behind the main power cylinder 40. A valve member 178 in the bore 54 has a cylindrical head portion 180 at the inner end thereof which fits snugly but slidably in the bore 54. On the head portion 180 is a central embossment 182 which defines a radial shoulder 184, and on the embossment is an integral central stem 186 which extends through a central opening 188 provided in a disc-shaped closure 190 in the outer end of the bore 54. The valve stem 186 is free to slide in and is guided by the opening 188 so that the valve member 178 is free to slide back and forth in the bore 54. Radial ports 192 in the closure 190 communicate with inner and outer annular grooves 194 and 196 also formed in the closure, and the outer groove 196 in turn communicates with an inclined passage 198 which opens at its outer end through the periphery of the chuck forwardly of the bore 54.

Thus, when the valve member 178 is in the position shown in FIGURE 8, air admitted into the passage 198 passes through the outer groove 196, ports 192, inner groove 194, bore 54 and passage 50 into the cylinder 40 behind the piston 42. However, a spring element 200 confined in the bore 54 behind the valve member 178 normally acts on the latter to urge it forwardly or outwardly in the bore and to position it with the shoulder 184 against the closure 190. When thus disposed, the shoulder 184 closes the inner annular groove 194 and prevents communication between the passages 198 and 50. The rearward or inner end of spring 200 seats on the bottom of the bore 54 and the forward or outer end thereof is received in a socket 202 in the valve element 178. An inclined passage 204 leading from the socket 202 and opening through the side of the valve member 178 behind the shoulder 184 permits equalization of pressure on opposite sides of the head portion 180 during movement of the valve member.

The shoe 176 here shown is generally similar in size and shape to the shoe 102 used in the first forms of the invention; however, in this instance the elongated slot or aperture 206 in the shoe which registers with the valve inlet passages 198 is disposed at one side of the shoe, as perhaps best shown in FIG. 8. The aperture 206 is defined by an elongate generally rectangular strip of felt or other sealing material 208 on the bottom of the shoe. It will be readily appreciated that the air inlet passages of all of the valves 174 are correspondingly situated on the chuck 172 so that the outer ends of the air passages 198 pass directly under the aperture 206 as the chuck rotates. Thus, when the shoe 176 is moved inwardly against the periphery of the chuck, as shown in the drawings, the aperture 206 registers with one or perhaps two of the passages 198 and the sealing strip 208 completely encloses the air inlet passage or passages 198 which open into and communicate with the aperture.

Air under pressure is admitted to the aperture 206 through an air passage 210 (FIG. 7), and the sealing strip 208 seals against the periphery of the chuck to confine the air and to limit its flow to the registering air inlet passage or passages 198.

A portion 212 of the shoe at one side of the aperture 206 is adapted to engage the stem 186 of each valve 178 disposed under the shoe when the latter seats against the chuck. As the shoe 176 approaches the chuck it engages any valve stem disposed under the shoe, and the terminal advancing movement of the shoe depresses the valve against the action of the spring 200 to unseat the valve shoulder 184 and effect communication between the air inlet passage 198 controlled by the valve and the cylinder 40 in the manner hereinabove described. The projecting outer ends of the valve stems 186 are rounded or spherically curved and the leading end of the shoe 176 is formed with an inclined cam surface 214 which engages the valve stems to depress the same in the event the chuck is still rotating when the shoe is advanced.

The shoe 176 is actuated and air under pressure is supplied to the shoe and to the cylinder 40 by an air supply system of the type shown diagrammatically in FIGURE 7. More particularly the shoe 176 is carried by a pneumatic actuator 216 which is suitably mounted on a stationary part of the machine that carries the chuck 172 or on other stationary structure adjacent to the chuck. As shown in the drawing, the actuator 216 comprises a cylinder 218 and a piston 220 reciprocable therein. A piston rod 222 carried by the piston 220 extends outwardly through one end of the cylinder 218 and the shoe 176 is fastened to the projecting end of the piston rod. An O-ring 224 recessed into the periphery of the piston 220 seals the annular space between the piston and the cylinder 218 in the conventional manner. Confined in the cylinder 218 behind the piston 220 is a spring 226 which holds the piston normally raised in the cylinder 218 with the shoe 176 disengaged from the chuck 172.

Air under pressure from a shop air line or other suitable source is conducted to the air supply system of this invention by a pipe 228 which connects with the inlet 230 of a three-way air valve 232. The air valve 232 here shown is a conventional type having two outlets 234 and 236 controlled by a manually operable handle 238. In one position of the handle 238 (the position shown in FIG. 7) air is free to flow through the valve 232 from the inlet 230 to the outlet 234 and the outlet 236 is closed. In another position (not shown) of the handle 238, the inlet 230 is closed and air is free to flow in a reverse direction from the outlet 234 to the outlet 236 to exhaust air in the system behind the valve. In this connection, it will be observed that a pipe 240 is connected at one end to the outlet 234 by a fitting 242. The other end of pipe 240 is connected to one branch of a T-fitting 244. Connected to the other branch of T-fittinfi 244 is a flexible tubing 246 which extends to and is connected in the air passage 210 in the shoe 176 by a fitting 248. A pipe 250 connected to and extending from the intermediate outlet of T-fitting 244 is connected to and communicates with the inlet end 252 of a standard air speed control valve 254; and a pipe 256 extends from the outlet end 258 of the speed control valve to a coupling 260 in an opening 262 provided in the upper end of the cylinder 218.

With the handle 238 positioned as shown in FIG. 7, air under pressure from the supply source is discharged through the outlet 234 and pipe 250 to the branch pipes 246 and 250. This air flows unrestrictedly through the speed control valve 254 and into the cylinder 218 where it creates sufficient pressure against the piston 220 to move it against the spring 226 and advance the shoe 176 into engagement with the chuck 172 and any valve or valves 174 that happen to be under the shoe. The air, of course, also flows through the flexible tube 246 to the shoe 176 and, as shown as the latter engages the chuck 172, through the particular valve or valves 174 under the shoe to the main power cylinder 40. Conversely, when the handle 238 is moved to connect the two ports 234 and 236, air discharges promptly from the power cylinder 40. However, in the latter position of handle 238, air traverses the speed control valve 254 relatively slowly and air pressure remains in the cylinder 218 above the piston 220 to hold the shoe 176 against the chuck until sufficient air has left the cylinder 40 to permit the chuck 172 to close. In other words, the shoe 176 remains in a down position to hold the valve or valves 174 engaged thereby open until air in the main power cylinder 40 behind the piston 42 is sufficiently exhausted to close the chuck. Shortly after, however, the chuck 172 closes pressure in the cylinder 218 above the piston 220 drops sufficiently so that the spring 226 begins to move the shoe 176 away from the chuck so that the latter is free to rotate. As the shoe 176 releases the chuck 172 it also releases the valve or valves 174 previously engaged thereby, and each such valve moves radially outwardly under the action of its spring 200 to seat the valve member 178 against the closure 190 preparatory to another operating cycle. In general, a time delay of one or two seconds is sufficient to exhaust the air from the power cylinder 40 sufficiently to permit closing of the chuck 172.

In most diaphragm chucks the piston 42 normally is urged rearwardly or away from the diaphragm and the work clamping jaws by one or more compression springs ahead of the piston, and these springs are assisted by the resilient action of the diaphragm which also tends to retract the piston. Thus, under the combined action of the front compression springs and the diaphragm, air behind the piston 42 is forced out rapidly as soon as the cylinder is connected to atmosphere through the valve outlet 236.

From the foregoing, it will be readily appreciated that in operation the chuck must stand still before any of the peripheral control valves 174 can be operated. However, as soon as the shoe 176 is actuated by the air cylinder 216 it moves radially inwardly against the periphery of the chuck engaging and opening one or perhaps two of the valves 174 and sealing the air inlet or inlets of the valve or the valves so engaged. In this position of the shoe 176, air under pressure enters the chuck 172 through the shoe and any valve or valves actuated thereby to operate the main power piston 42 and to open the chuck for unloading and loading. When the chuck 172 is to be closed, the shoe 176 must be held in contact with the periphery of the chuck in order to keep the valve or valves engaged thereby open until air in the cylinder 40 has escaped. After that the shoe 176 retracts and clears the chuck for operation. This delay is accomplished in the manner hereinabove described by the air speed control valve 254.

Having thus described the invention, we claim:

1. In a diaphragm chuck having a cylinder and a piston mounted for reciprocation in said cylinder adapted to actuate said diaphragm to open said chuck, the improvement comprising an annular member rotatable with said chuck having a plurality of circumferentially spaced ports opening through the periphery thereof and communicating with said cylinder at one side of said piston, a shoe selectively movable radially into and out of sealed peripheral engagement with said member and having a fluid passage provided with a discharge orifice registerable with at least one of said ports in all rotatable positions of said member, a fluid supply line connected to said passage, valve means controlling said fluid supply line, actuator means for moving said shoe into and out of engagement with said rotatable member, a valve in each of said ports, each valve adapted to be opened by external fluid pressure when said shoe is in engagement with said member and said orifice is in register with the port with which said valve is associated, yieldable means in said ports for holding all of said valves normally closed, and means for releasably holding each open valve in the open position for a predetermined limited period of time when fluid pressure in said supply line is shut-off to permit escape of fluid from said cylinder and responsive to centrifugal force due to rotation of said member to permit said valve to close.

2. In a diaphragm chuck having a cylinder and a piston mounted for reciprocation in said cylinder adapted to actuate said diaphragm to open said chuck, the improvement comprising a member at the back of the chuck and rotatable therewith having a plurality of circumferentially spaced ports opening through the periphery of said member and communicating with said cylinder at one side of said piston, means for selectively introducing fluid under pressure into said cylinder including a shoe having an orifice registerable with at least one of said ports in all rotatable positions of said member, valve controlled means associated with said shoe for delivering fluid under pressure to said orifice, means for moving said shoe into and out of peripheral engagement with said member and said orifice into and out of register with at least certain of said ports, means for sealing said orifice on said member when the shoe is in engagement therewith so that fluid delivered to said orifice is restricted to enter any port or ports in register therewith, a valve in each of said ports adapted to be opened by external fluid pressure when said shoe is in engagement with said member and said orifice is in register with the port with which said valve is associated, means for directing air discharging from said cylinder onto each open valve in said member so as to hold the latter in the open position for a predetermined limited period of time when fluid pressure thereto is shut-off and the port containing said valve is opened to atmosphere or other pressure less than the pressure in said cylinder, said valve being closable by centrifugal force upon rotation of said member, and yieldable means in said ports for holding all of said valves normally closed.

3. A device having a cylinder, a piston mounted for reciprocation in said cylinder, and a part operatively connected to and actuatable by said piston, the improvement comprising a rotatable member having a plurality of circumferentially spaced ports opening through the periphery of said member and communicating with said cylinder at one side of said piston through which fluid under pressure is admitted to and discharged from said cylinder, means for moving said shoe into and out of engagement with said member, said shoe having a fluid passage provided with a discharge orifice registerable when the shoe is in engagement with the member with at least one of said ports in all rotative positions of said member, valve means controlling said fluid passage and operable to selectively connect said orifice to a source of fluid pressure or to atmosphere, valves in said ports, each valve adapted to be opened by external fluid pressure when said shoe is in engagement with said member and said orifice is in register with the port with which said valve is associated, a spool for each valve having lateral openings disposed to be above said valve when the latter is open, said openings communicating with said cylinder and with said port, whereby fluid jets discharging from said cylinder through said openings when said port is connected to atmosphere are directed onto any open valve to hold the same open until pressure in the cylinder is relieved, and yieldable means in said ports for closing said valves when pressure in the cylinder is relieved and for holding said valves normally closed.

4. In a device having a rotatable cylinder and a piston mounted for reciprocation in said cylinder and rotatable therewith, an annular series of ports communicating with said cylinder at one side of said piston, means for selectively supplying air under pressure to said cylinder and for exhausting air in said cylinder to atmosphere through said ports including valves in said ports controlling flow of exhaust air therethrough, said valves adapted to be opened by external air pressure to admit air to said cylinder and to be closed by centrifugal force to hold air pressure in the cylinder, and means associated with said valves for holding any open valve in the open position for a predermined limited period of time when air pressure in said cylinder is relieved to atmosphere.

5. In a diaphragm chuck of the type adapted to be rotatably driven and having a power cylinder rotatable therewith and a piston reciprocable in said cylinder, the improvement comprising an annular series of ports in the periphery of said chuck communicating with said cylinder at one side of said piston, a tubular valve retainer in each port disposed with the axis thereof extending substantially radially of said chuck, a valve seat at the outer end of each retainer, a valve in each retainer movable radially outwardly against its seat by centrifugal force when the chuck is rotated to close the port and movable radially inwardly from its seat to open said port, means for introducing air under pressure into said cylinder through certain of said ports operative to unseat the valves in said certain ports and for selectively opening said certain ports to atmosphere, and side apertures in said retainers disposed to be behind said valves when the latter are at one end of said retainers and against their seats and to be in front of said valves when the latter are at the other ends of said retainers and off their seats, said apertures directing jets of air onto any of said valves that are in the open position when the port associated with the valve is open to atmosphere whereby to hold said valve open until air is substantially exhausted from said cylinder.

6. In a diaphragm chuck of the type adapted to be rotatably driven and having a power cylinder rotatable therewith and a piston reciprocable in said cylinder, the improvement comprising an annular series of ports in the periphery of said chuck communicating with said cylinder at one side of said piston, a tubular valve retainer in each port disposed with the axis thereof extending substantially radially of said chuck and having side apertures at substantially the middle thereof, a valve seat at the outer end of each retainer, a valve in each retainer movable radially outwardly against its seat by centrifugal force when the chuck is rotated to close the port and radially inwardly from its seat to open said port, a shoe movable radially to and from the periphery of said cylinder having an air passage provided with a discharge orifice registerable with at least one of said ports in all rotatable positions of said cylinder, means for selectively supplying air under pressure to said passage, means for moving said shoe against said cylinder with said orifice in register with at least one of said ports so that air under pressure will unseat the valve in said one port and enter said cylinder through said apertures, and means for disengaging said shoe from said cylinder to open said certain port to atmosphere, whereupon air discharging from said cylinder through said apertures forms jets which hold the previously opened valve open until the air is substantially exhausted from said cylinder.

7. In a diaphragm chuck of the type adapted to be rotatably driven and having a power cylinder rotatable therewith and a piston reciprocable in said cylinder, the improvement comprising an annular series of ports in the periphery of said chuck communicating with said cylinder at one side of said piston, a tubular valve retainer in each port disposed with the axis thereof extending substantially radially of said chuck, a valve seat at the outer end of each retainer, said retainers having side apertures behind said valve seats through which said ports communicate with said cylinder, a valve on each retainer movable radially outwardly against its seat by centrifugal force when the chuck is rotated to close the port and radially inwardly from its seat to open said port, a shoe having a sealing face shaped to fit and to complement the periphery of said cylinder and provided with an air passage having a discharge orifice in said sealing face, air pressure operated means operatively connected to said shoe to move the sealing face thereof against and from said cylinder, said discharge orifice being registerable when in engagement with said cylinder with at least one of said ports in all rotative positions of said cylinder, means for connecting said passage to a source of air pressure, and valve means for closing said passage when said shoe is away from said cylinder adapted to be opened when said shoe is against said cylinder to admit air under pressure through said orifice and the port in register therewith into said cylinder, admission of air under pressure into said port being operative to unseat the valve in said port and disengagement of said shoe from said cylinder opening said port to atmosphere whereupon air discharging from said cylinder through said apertures forms jets which hold said valve open until air is substantially exhausted from said cylinder.

8. In an air operated rotatable diaphragm chuck of the type having a power cylinder rotatable with the chuck and a piston mounted for reciprocation in said power cylinder and operatively associated with the diaphragm portion of the chuck, the improvement comprising a plurality of circumferentially spaced ports in the cylinder having inlet ends arranged substantially concentrically to the axis of said cylinder and discharge ends opening into the cylinder behind said piston, a shoe aligned with the inlet ends of said ports selectively movable into and out of engagement with the chuck and having an air passage provided with a discharge orifice registerable with the inlet end of at least one of said ports when the shoe is in engagement with the chuck in all rotative positions of the latter, an air supply line connected to said passage for delivering air under pressure thereto, a normally closed valve in each of said ports adapted when disposed under said shoe to be opened by movement of the latter into engagement with said chuck and operable by registration of said orifice with the port with which said valve is associated to admit air under pressure into said power cylinder, and means for holding each open valve in the open position for a predetermined limited period of time when air pressure in said supply line is shut off to permit escape of air from said cylinder.

9. In an air operated rotatable diaphragm chuck of the type having a power cylinder rotatable with the chuck and a piston mounted for reciprocation in said power cylinder and operatively associated with the diaphragm portion of the chuck, the improvement comprising a plurality of circumferentially spaced ports in the cylinder having inlet ends arranged substantially concentrically to the axis of said cylinder and discharge ends opening into the cylinder behind said piston, a shoe aligned with the inlet ends of said ports selectively movable into and out of engagement with the chuck and having an air passage provided with a discharge orifice registerable with the inlet end of at least one of said ports when the shoe is in engagement with the chuck in all rotative positions of the latter, an air supply line connected to said passage for delivering air under pressure thereto, a normally closed valve in each of said ports adapted when disposed under said shoe to be opened by movement of the latter into engagement with said chuck and operable by registration of said orifice with the port with which said valve is associated to admit air under pressure into said power cylinder, a control valve in said air supply line for selectively connecting said air passage to a source of air pressure or to atmosphere, and time delay means operatively associated with said shoe for holding the latter engaged with the chuck for a predetermined limited period of time after said air passage is connected to atmosphere.

10. In a rotatable diaphragm chuck having a power cylinder rotatable therewith and a piston mounted for reciprocation in said cylinder adapted to actuate said diaphragm to open said chuck, the improvement comprising a member on and rotatable with said chuck having a plurality of circumferentially spaced ports opening through the periphery thereof and communicating with said cylinder at one side of said piston, a shoe movable radially into and out of sealed peripheral engagement with said member and having a fluid passage provided with a dischrage orifice registerable with said ports, an air supply line connected to said passage, valve means controlling said air supply line, an operated actuator means connected to said shoe for moving the latter into and out of engagement with said chuck, normally closed valves in said ports having stem portions normally projecting beyond the periphery of said member, said ports and said valves being sufficiently close together so that at least one thereof is in alignment with and engageable by said shoe in all rotative positions of said chuck, any of said valves adapted to be opened by engagement of said shoe with the stem portion thereof to admit air under pressure into said power cylinder, and time delay means connected to said air supply line and to said actuator means operable to hold said shoe in engagement with said chuck for a predetermined limited period of time when air pressure to said chuck is cut off by said valve means and then to retract said shoe from said chuck to effect closure of any open valve.

References Cited in the file of this patent

UNITED STATES PATENTS

| | | |
|---|---|---|
| 2,500,383 | Sadler | Mar. 14, 1950 |
| 2,509,673 | Church | May 30, 1950 |
| 2,655,384 | Peterson | Oct. 13, 1953 |
| 2,888,966 | Morgan | June 2, 1959 |